United States Patent [19]

Kotlarz

[11] 4,092,979
[45] June 6, 1978

[54] COMBINED SOLAR ENERGY CONVERSION AND STRUCTURAL AND MECHANICAL BEAM AND STRUCTURES BUILT THEREFROM

[76] Inventor: Joseph C. Kotlarz, 109 W. Woodlawn Dr., Mundelein, Ill. 60060

[21] Appl. No.: 738,845

[22] Filed: Nov. 4, 1976

[51] Int. Cl.² .............................................. F24J 3/02
[52] U.S. Cl. .................................... 126/271; 237/1 A
[58] Field of Search ............... 126/271, 270; 237/1 A

[56] References Cited

U.S. PATENT DOCUMENTS

| 1,683,266 | 9/1928 | Shipman | 126/271 |
|---|---|---|---|
| 3,990,914 | 11/1976 | Weinstein et al. | 126/270 |
| 4,011,857 | 3/1977 | Rice | 126/271 |
| 4,038,971 | 8/1977 | Bezborodko | 126/271 |

Primary Examiner—Carroll B. Dority, Jr.
Attorney, Agent, or Firm—Gildo E. Fato

[57] ABSTRACT

Disclosed is a combined solar energy conversion and structural and mechanical beam. The beam comprises a pre-engineered structural and mechanical component which includes a solar energy collector or distributor and can be used to erect a complete structure or as retrofite hardware for existing buildings or structures. In one embodiment, the solar collector portion of the beam consists of a highly polished parabolic concentrator within a channel-shaped portion of the beam, an absorber tube disposed within the concentrator for retaining the fluid to be heated, and an optical or fresnel lens positioned over the open side of the beam to further concentrate the sun and sky radiation. Other portions of the beam, or separate beams, can be used to house a manifold system to transport the fluid heated by the solar collector portion, or a distributor or diffuser can be disposed therein to facilitate the flow of warm or cool air into the desired area.

10 Claims, 6 Drawing Figures

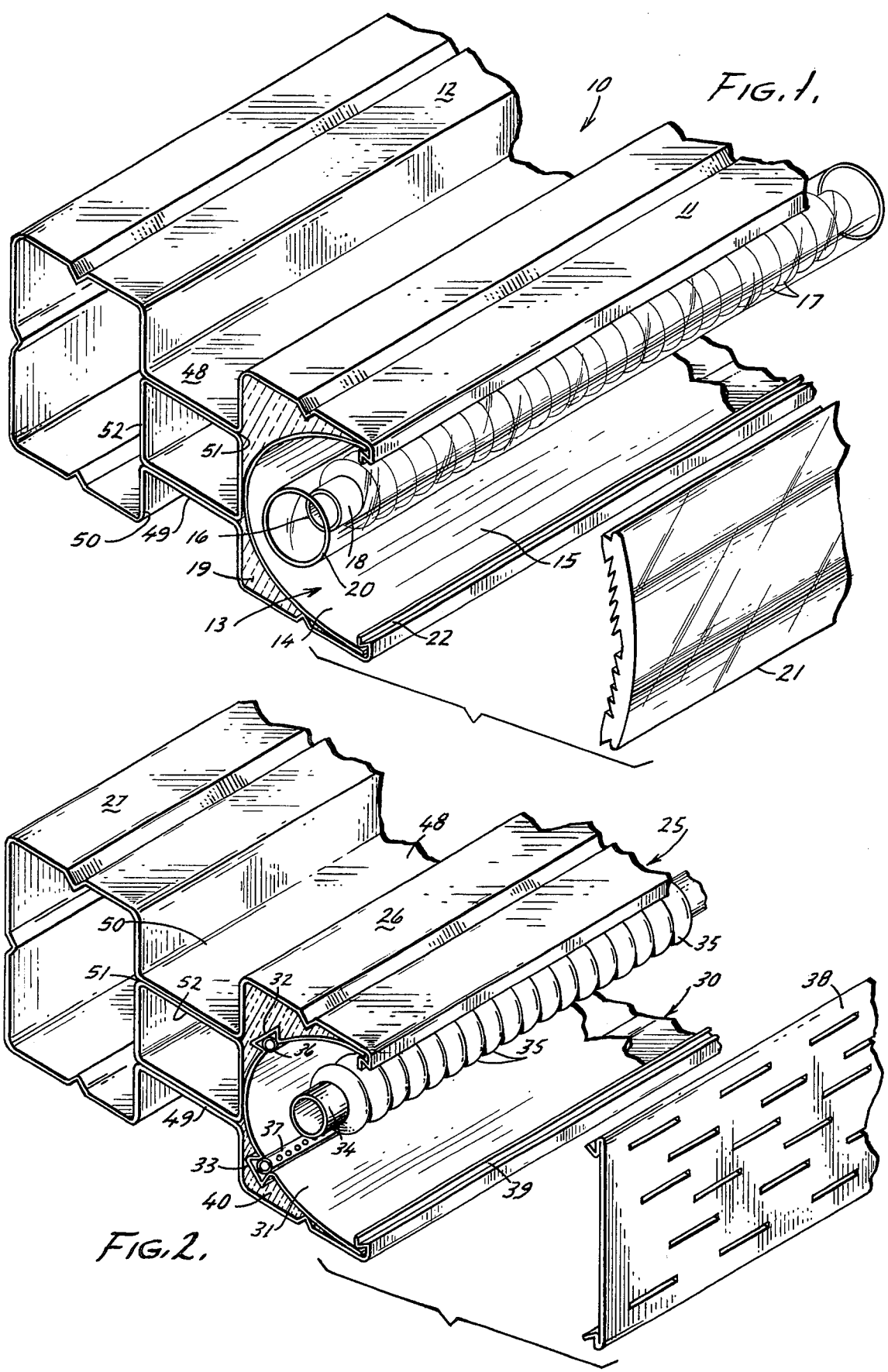

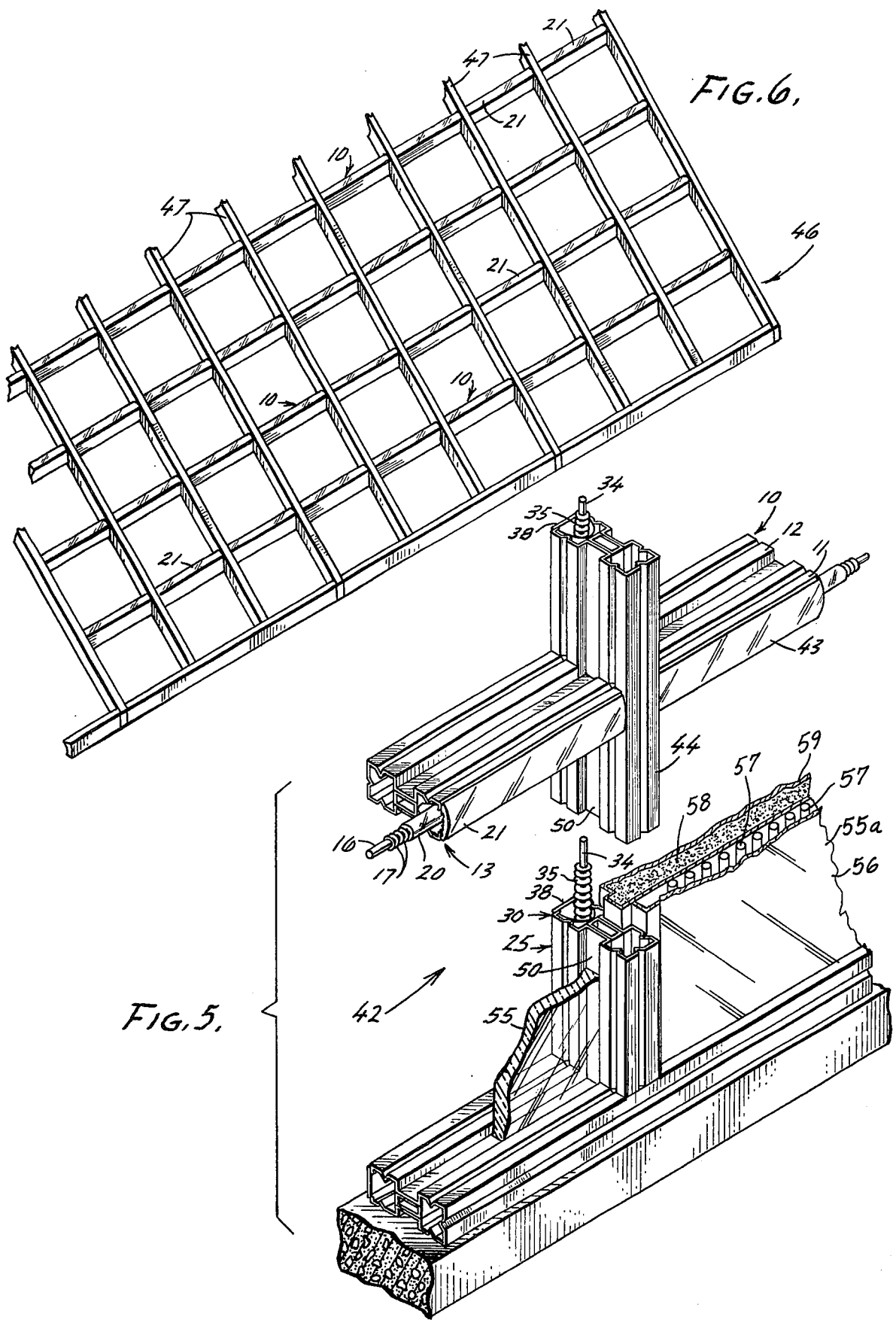

COMBINED SOLAR ENERGY CONVERSION AND STRUCTURAL AND MECHANICAL BEAM AND STRUCTURES BUILT THEREFROM

BACKGROUND OF THE INVENTION

With the increasing scarcity and expense of fossil fuels, the development of alternative fuel sources and heating and cooling systems has become desirable. One possible alternative is the conversion of solar energy. Many proposals and designs have been made for collecting solar energy, most of which have generally comprised exposing a liquid to sunlight to directly increase the temperature of the liquid sufficiently to be able to extract heat therefrom. The development of an economical and efficient means of heating or cooling buildings with solar energy is considered an important requirement for the implementation of solar energy as an alternative to fossil energy sources for producing thermal conform in buildings. A major objective has been to collect as much sun and sky radiation as possible, at the highest attainable temperature, for the lowest possible investment in labor and materials.

As outlined in UTILIZATION OF SUN AND SKY RADIATION FOR HEATING AND COOLING BUILDINGS by John I. Yellott in *ASHRAE JOURNAL*, December, 1973, pages 31-41, solar radiation can be collected by a flat plate collector which can use both direct and diffuse radiation, or a concentrating device, which can use only the direct rays of the sun. A flat plate collector generally consists of five components: (1) glazing, which may be one or more sheets of glass or plastic; (2) tubes or fins for conducting or directing the heat transfer fluid from the inlet duct or heater; (3) a plate, generally metallic; (4) insulation; and (5) a container or casing which protects the components from dust and moisture. Flat plate collectors are generally large and cumbersom and are placed facing south in a tilted arrangement at some distance from the building they are to heat, or on the roof of the building. Either arrangement is undesirable from both an exthetic or structural viewpoint.

Temperatures higher than those possible with flat plate collectors are attainable if a large amount of solar radiation is concentrated upon a relatively small collection area. As pointed out by Yellot in the noted publication, paraboloidal concentrators can attain extremely high temperatures, but they require very accurate tracking systems and they can use only the direct rays of the sun, since diffuse radiation cannot be concentrated. The publication also notes that the principal use of concentrating collectors in the past has been in the production of steam or high temperature fluids for use in refrigeration or power generation. The higher cost and added mechanical complexity of collectors which must follow the sun, and their inability to function at all on cloudy or overcast days are pointed out as disadvantages.

POPULAR MECHANICS edition of September, 1975, describes a number of concentrator type collectors. In the Northrup collector which is described, a curved Fresnel lens focuses intensified sun heat onto an absorber tube located at the bottom of a steel trough. An array of up to forty collectors swivels to track the sun. Another solar concentrating system to increase the temperature at which the solar energy is collected is described in J. VAC. SCI. TECHNOL.; Vol. 12, No. 1, Jan./Feb., 1975. In the system described, a parabolic trough concentrates the solar energy onto a thermal transfer pipe at the focus of the system. The pipe is surrounded by a glass cylinder which is evacuated to reduce convestive and conductive losses. The parabolic reflector must track the sun to maintain the image on the thermal transfer pipe.

Collector plates, or concentrating devices assembled in an array, take up considerable space and must be located at some distance from the building they are to service, or on the roof thereof as previously noted, making such arrangements undesirable from a number of viewpoints. Other solar energy conversion arrangements capable of being incorporated into existing structures or new buildings in an effective and esthetic manner and therefor desirable.

SUMMARY OF THE INVENTION

Disclosed is a solar collector and distributor structural and mechanical beam for heating and cooling purposes. The collector comprises a pre-engineered structural and mechanical component which can be used as a structural member for a complete building or structure or as retrofit hardware or device for existing buildings or structures and for commercial, institutional, recreational, industrial, space structures and transportation.

The solar collector portion of the beam consists of a highly polished parabolic mirror concentrator arranged within a channel-shaped portion of a beam with a tube positioned within the concentrator for heating the fluid therein to the highest possible temperature range. For greater efficiency, spiral fins or disks can be formed or positioned on the tube. Likewise, a transparent glass or plastic high temperature tube can be inserted over the spiral finned or disked tube to achieve higher temperature in order to drive low pressure steam turbines for generating electrical power. The cover on the open side of the channel-shaped portion of the structural and mechanical beam is preferably an optical lens or a fresnel lens sheet, either of which can be made of glass or plastic.

The solar collector structural and mechanical beam can be used to erect a structure or building by employing the beam in forming a supporting framework and roof of generally vertical and horizontal arrangement as disclosed in U.S. Pat. Nos. 3,415,024, issued Dec. 10, 1968 or 3,893,271 issued July 8, 1975. When employed in such structures, the solar collector portion can be disposed within the generally horizontal members, with the solar collector facing outwardly so that it is exposed to the sun. The generally vertical members can be used for a manifold system to transport the fluid heated by the collectors, or as hereinafter described, a distributor can be disposed within the vertical members to more efficiently dissipate the flow of warm or cool air into the comfort zone or area.

When used in a system for heating and cooling, the collector, as noted, is disposed facing outwardly, exposed to the sun. To more efficiently distribute heat, for example, which is stored in the fluid heated by the collector, a diffuser can be positioned in the channel-shaped portion of a beam, facing inwardly. The diffuser comprises a parabolic reflector, preferably coated black, disposed within the channel-shaped member. As with the collector, a tube is positioned within the reflector, the tube having spaced disks or spiral fins formed thereon to more efficiently dissipate the heat. Two grooves are formed in the parabolic reflector and a small metal or plastic tube is inserted in each groove.

Small, spaced aperatures or holes are formed in the tubes, one of which is used to spray water on the heated element for misting or vaporizing when humidification is desired, or in the case of greenhouses or hydroponic structures, when moisture is required. Air is forced through the other tube to dissipate the flow of warm or cool air to the comfort zone or area at a faster rate.

The pre-engineered component described can be used wither as a horizontal or vertical member in a single wall, skylite, dome, mansar roof, lean-to or total structure for any geometric design. Further, the solar collector structural and mechanical beam can be formed in an array for conversion of solar energy into heat or electricity.

BRIEF DESCRIPTION OF THE DRAWINGS

The invention can be better understood by reference to the following detailed description when considered in connection with the accompanying drawings illustrating a preferred form embodying the invention and wherein:

FIG. 1 is a fragmentary perspective view, illustrating the solar collector portion of one embodiment of the solar collector structural and mechanical beam of the present invention;

FIG. 2 is a fragmentary perspective view, illustrating the diffuser portion of the solar collector structural and mechanical beam;

FIG. 5 is a fragmentary perspective view of a framework structure employing the solar collector structural and mechanical beam of the present invention and including the solar collection and diffuser portions of FIGS. 1 through 4; and FIG. 6 is a fragmentary perspective view of an array of the solar collector and diffuser portions of the structural and mechanical beam of FIGS. 1 through 4.

DETAILED DESCRIPTION OF THE INVENTION

Figure 3:
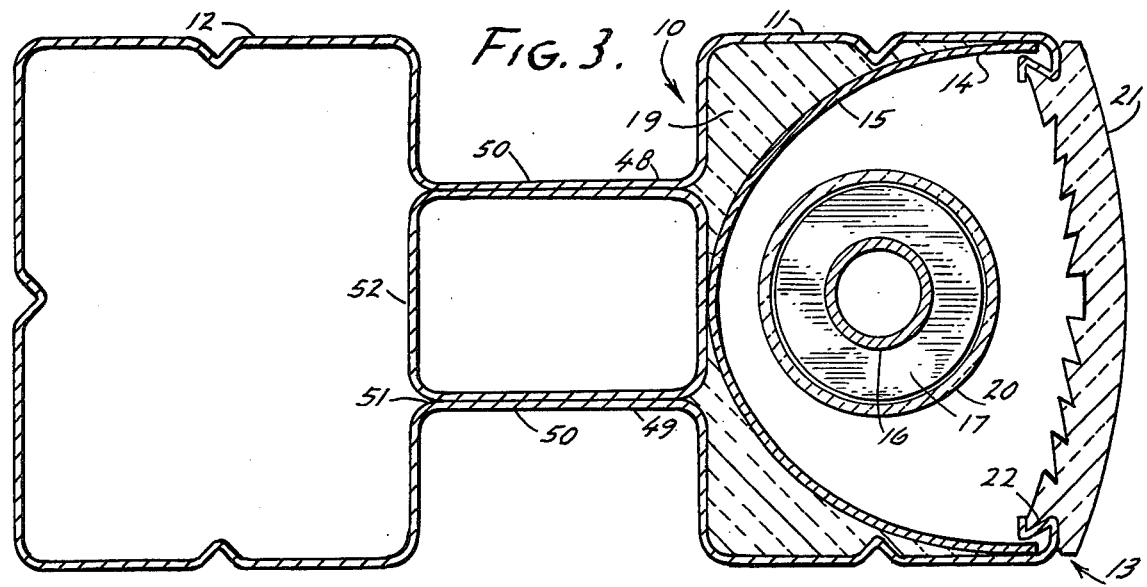
FIG. 3 is a cross-sectional view of the solar collector portion of the structural and mechanical beam, as illustrated in FIG. 1.

FIGS. 1 and 3, in particular, illustrate the solar collector portion of an exemplary solar collector structural and mechanical beam of the present invention. FIG. 1 illustrates a beam 10 having opposed channel-shaped portions 11, 12 in one 11 of which is arranged the solar collector assembly 13. The solar collector assembly 13 comprises a highly polished reflector, preferably a parabolic mirror concentrator 14, arranged within the channel-shaped portion 11 of the beam 10. The concentrator 14 includes a mirror or reflecting surface 15 in order to better utilize the sun's rays. An absorber tube 16 is disposed within the concentrator 14 spaced therefrom in order to better absorb the sun's energy. For greater efficiency, spiral fins or disks 17 can be formed or positioned on the absorber tube 16. The outer surface 18 thereof as well as the spiral fins or disks 17 preferably include a black coating such a nickel oxide or black chrome which are efficient absorbers of sunlight and low emitters of heat. Likewise, a transparent glass or plastic high temperature tube 20 can be positioned over the absorber tube 16 to achieve even higher temperatures for applications such as driving low pressure steam turbines. To achieve even higher temperatures, the transparent cover 21 for the open side 22 of the channel-shaped portion 11 of the solar collector structural and mechanical beam 10 can be an optical lens or a fresnel lens sheet, as illustrated, either of which can be made of glass or plastic. If desired, insulation 19 can be placed in the channel 11 behind the concentrator 14 to help retain the heat collected. The opposing channel-shaped portion 12 of the beam 10 can be used to house a manifold system to transport the fluid heated by the collectors 13 or utilities such as electrical, communication systems, or telephone wires. If the heated fluid is to heat the interior of a structure made from the solar collector structural and mechanical beam 10, the opposing channel 12, a separate beam, can be used to house a distributor or diffuser assembly 30, as hereinafter described.

When the solar collector structural and mechanical beam 10 is incorporated into a structure or building, the collector assembly 13 can be incorporated into the generally horizontal members, as illustrated in FIG. 5, and a diffuser assembly can be placed in the generally vertical members to dissipate the heat collected into the structure or building.

Figure 4:
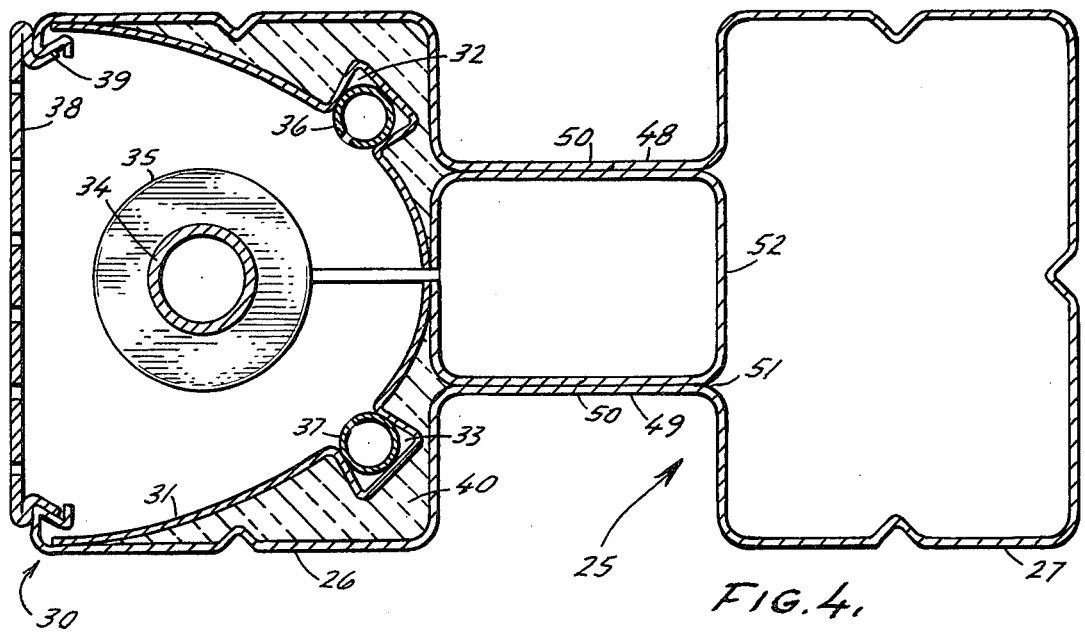
FIG. 4 is a fragmentary cross-sectional view of the diffuser portion of the structural and mechanical beam, as illustrated in FIG. 2.

FIGS. 2 and 4 best illustrate the diffuser assembly 30 incorporated into a structural and mechanical beam 25 which, as does the solar collector structural and mechanical beam 10, includes opposed channel-shaped portions 26, 27. The diffuser assembly 30 is positioned within the channel-shaped portion 26 and includes a parabolic reflector 31 having two grooves 32, 33 formed therein for receiving small tubes or conduit. Insulation 40 is placed behind the reflector 31 to help maintain the temperature of the fluid. As with the solar collector assembly 13, a tube 34 is disposed with the reflector 31 spaced therefrom to receive the heated fluid generated by the solar collector assembly 13. Similar to the absorber tube 16, spaced disks or fins 35 can be formed or positioned on the tube 34 to more efficiently dissipate the heat therein. Small metal or plastic tubes 36, 37 having spaced aperatures or a longitudinal slot therein are placed in the grooves 32, 33, in the parabolic reflector 31, through one 36 of which is pumped water for spraying on the heated tube 34 to produce misting or vaporizing when humidification is desired within a structure or building, or when moisture is required as in greenhouses or hydroponic structures. Air is forced through the other tube 37 to better dissipate the flow of warm air to the comfort zone or area. A decorative panel 38 or cover can be placed over the open side of the channel 39 when the diffuser assembly 30 is utilized in heating the interior of a building for example, when an attractive appearance is desirable.

The solar collector structural and mechanical beam 10, 25 can be employed as a pre-engineered component for a framework structure to erect a single wall, roof or complete geometric design. FIG. 5 is exemplary of a framework structure 42 in which the solar collector structural and mechanical beam 10 is employed as the generally horizontal members 43 with the solar collector assembly 13 facing outwardly thereby being exposed to the sun and the beam 25 used for the generally vertical members 44 having disposed therein the diffuser assembly 30, as previously described, to dissipate the flow of warm air into the comfort zone or area.

The pre-engineered component can be used either as a horizontal or vertical member as described to form a single wall, skylite, dome mansar roof, lean-to or total structure. FIG. 6 illustrates an arrangement of a plurality of the solar collector structural and mechanical beam 10 which can be utilized as a single wall, roof, false roof, or separate array. The arrangement 46 comprises a plurality of spaced solar collector structural and mechanical beams 10 arranged in a generally horizontal direction and a plurality of spaced, generally vertically disposed beams so that the beams are arranged in a transverse relation to each other, engaged at preselected points to form a grid framework structure. The generally vertically disposed beams 47 can have contained therein collector assemblies 13, diffuser assemblies 30, or a manifold system, depending on the use or purpose of the array or framework structure 46. When used as a false roof, for example, the framework structure 46 can be placed over a building's actual roof, on an easterly, southerly or westerly location and the beams 47 will preferably contain a manifold system to transport the fluid heated in the collector assemblies 13 of the beams 10 to a storage tank (not shown) or to diffuser assemblies 30 in other portions of the structure. The framework structure 46, as a false roof, can be mounted in a movable fashion so it can be tilted or turned to track the sun. Likewise, the framework structure 46 can be utilized as a separate array, located away from the building with which it is associated and movable mounted so that it can track the sun.

While the collector assembly 13 can be disposed in any suitable structural member, preferably of channel cross-section, the beams 10, 25, are particularly adaptable for solar collection purposes, as hereinafter described. As illustrated, the beams 10, 25 comprise opposed portions 11, 12, 26, 27 of channel cross-section connected by a pair of spaced walls 48, 49 to define longitudinally extending opposed recesses 50 and a slot or space 51 therebetween into which can be inserted a reinforcing member 52, if desired. When the beams 10, 25 are assembled into a framework structure as illustrated in FIG. 5, for example, glazing, wall, flat plate solar collectors or other panels 55 can be installed in the recesses 50 to complete the structure or building.

If desired, to augment the heat collecting capabilities of the solar collecting assemblies 13, flat plate solar collectors, 55a, comprising glazing 56, fluid conduit or tubing 57, insulation 58, and a casing 59, as described by Yellott in the noted article, can be positioned in the recesses 50 of the beams 10, 25. Flat plate collectors 55 can be installed in a portion of the framework structure constructed of the solar collector structural and mechanical beam 10, with glazing or decorative panels 55 being installed in the remaining portion. Likewise, solar electric panels, containing cadmium sulfide, silicon, or photovoltaic cells as described by Yellot, can be installed in the framework structure as illustrated in FIG. 5 to generate electricity. As a consequence, a structure constructed of the solar collector and diffuser structural and mechanical beams 10, 25 will comprise an integral, complete, esthetically pleasing and functionally effective building or structure including its own energy conversion system, separate and distinct from the conventional heating, cooling and electrical systems.

What is claimed is:

1. A combined solar collector and structural and mechanical beam, said beam comprising; spaced, longitudinally extending, adjacent channel-shaped portions, at least one of said channel-shaped portions having an open side, said beam also including a longitudinally extending recessed portion between the channel-shaped portions;
a solar collector assembly disposed within the channel-shaped portion having the open side, said solar collector assembly comprising a highly polished reflector arranged within the channel-shaped portion; an absorber tube disposed within the reflector and spaced therefrom to absorb the sun's energy; and
a transparent cover positioned over the open end of said channel portion.

2. The combined solar collector and structural and mechanical beam of claim 1 wherein said transparent cover comprises an optical lens.

3. The combined solar collector and structural and mechanical beam of claim 1 wherein said transparent cover comprises a fresnel lens.

4. The combined solar collector and structural and mechanical beam of claim 3 wherein said reflector comprises a parabolic concentrator.

5. The combined solar collector and structural and mechanical beam of claim 4 including a transparent high temperature tube positioned over the absorber tube.

6. A framework structure having solar energy conversion capabilities incorporated therein and comprising:
spaced, generally horizontally and vertically disposed members arranged in transverse relation to each other, said generally horizontal members being engaged with said generally vertical members at preselected points thereon to form a framework structure, and panel means closing the space between said horizontally and vertically disposed members;
at least some of said members comprising a combined solar collector and structural and mechanical beam, said beam including a channel-shaped portion having an open side and a solar collector assembly including a parabolic reflector and an absorber tube disposed within said channel-shaped portion.

7. The framework structure of claim 6 wherein said reflector is highly polished, said absorber tube disposed within the reflector and spaced therefrom to absorb the sun's energy; and a transparent cover positioned over the open end of said channel-shaped portion.

8. The framework structure of claim 7 wherein at least some of said members comprise a combined diffuser structural and mechanical beam, said beam including a channel-shaped portion having an open end, a diffuser assembly positioned within the channel-shaped portion, the diffuser assembly comprising a parabolic reflector having two grooves formed therein; tubes disposed within said grooves, the tubes having openings along the length thereof; and a tube disposed within the reflector and spaced therefrom for receiving fluid.

9. The framework structure of claim 7 including flat plate solar collectors fitted within at least some of the generally horizontally and vertically disposed members.

10. A combined diffuser and structural and mechanical beam, said beam comprising:
spaced, longitudinally extending, adjacent channel-shaped portions, at least one of said channel-shaped portions having an open side;
a diffuser assembly disposed within the channel-shaped portion having the open side, said diffuser assembly comprising a parabolic reflector arranged within said channel-shaped portion, said reflector having two grooves formed therein; tubes disposed within the grooves, the tubes having openings along the length thereof; and a tube disposed within the reflector and spaced therefrom for receiving fluid.

* * * * *